United States Patent [19]

Werner et al.

[11] Patent Number: 4,670,332

[45] Date of Patent: Jun. 2, 1987

[54] IRREVERSIBLE OPTICAL MEDIUM FOR INFORMATION STORAGE, AND ITS PRODUCTION

[75] Inventors: Arend Werner; Hartmut Hibst; Klaus D. Schomann, all of Ludwigshafen, Fed. Rep. of Germany

[73] Assignee: BASF Aktiengesellschaft, Fed. Rep. of Germany

[21] Appl. No.: 785,758

[22] Filed: Oct. 9, 1985

[30] Foreign Application Priority Data

Oct. 13, 1984 [DE] Fed. Rep. of Germany ....... 3437657

[51] Int. Cl.$^4$ .......................... C09V 7/02; G01D 9/00; G01D 15/26
[52] U.S. Cl. .................................. 428/323; 430/945; 346/135.1; 346/137
[58] Field of Search ...................... 430/945; 346/135.1, 346/137.1; 428/323

[56] References Cited

U.S. PATENT DOCUMENTS

| | | | |
|---|---|---|---|
| 4,188,214 | 2/1980 | Kido et al. | 430/ |
| 4,252,890 | 2/1981 | Haas et al. | 430/ |
| 4,343,879 | 8/1982 | Drexler et al. | 430/ |
| 4,431,711 | 2/1984 | Enfeller | 428/31 |
| 4,526,807 | 7/1985 | Auerbach | 427/53.1 |
| 4,531,183 | 7/1985 | Morimoto et al. | 346/135.1 |

FOREIGN PATENT DOCUMENTS 0083396 7/1983 European Pat. Off. .
WO83/04330 12/1983 PCT Int'l Appl. .

OTHER PUBLICATIONS

C. Granquist, R. A. Buhrman: "Journal of Applied Physics", vol. 47, No. 5, May 1976, S. 2200–2219.

*Primary Examiner*—John E. Kittle
*Assistant Examiner*—Patrick J. Ryan
*Attorney, Agent, or Firm*—Keil & Weinkauf

[57] ABSTRACT

An irreversible optical medium for storing information by local modification of the optical properties of a recording layer under the action of a light beam with an irradiance of from 0.05 to 10 nJ $\mu m^2$, essentially consisting of a substrate and, applied on this, a particulate recording layer from 0.01 to 10 $\mu m$ thick, wherein the recording layer consists of a three-dimensional arrangement of particles having a mean particle diameter of from 4 to 40 nm, and a process for its production.

4 Claims, No Drawings

IRREVERSIBLE OPTICAL MEDIUM FOR INFORMATION STORAGE, AND ITS PRODUCTION

The present invention relates to an irreversible optical medium for storing information by local modification of the optical properties of a recording layer under the action of a light beam with an irradiance of from 0.05 to 10 nJ/$\mu$m$^2$, essentially consisting of a substrate and, applied on this, a particulate recording layer from 0.01 to 10 $\mu$m thick, and a process for its production.

The irreversible optical storage of information is based on the production of unalterable characters on a medium by the action of light. The light source used is a laser beam, whose diameter is focussed to about 1 $\mu$m. The medium, which is generally in the form of a disk, possesses a recording layer whose optical properties, mainly the reflectivity or the absorption, are altered locally by irradiation with the laser. The character is in general a hole burnt into the recording layer. The information is also read by means of a laser, although the laser energy selected is substantially smaller than for the write operation.

The recording medium for the irreversible optical storage of information consists of a substrate and one or more layers applied on this, one or more of which layers, or a component of these layers, absorbing the incident light and hence either itself experiencing an irreversible local change in reflectivity or irreversibly changing the reflectivity of an adjacent layer.

A medium of this type must be very sensitive so that a low laser power is sufficient for writing. The high sensitivity necessitates low heat losses during writing, and this can be achieved by the absorbing layer itself possessing low thermal conductivity. Furthermore, heat losses can be reduced by embedding the absorbing layer between thermally insulating intermediate layers. Furthermore, the characters produced during writing must exhibit good contrast. For this purpose, it is frequently necessary to place a reflecting layer underneath the absorbing layer. Since the irreversible optical storage media are used preferentially for storing large amounts of data in archives, the medium must have a long life. Hence, to protect the recording medium from chemical and mechanical damage, this layer is usually provided with a protection. The latter, which consists of either a layer which is in direct contact with the layers of the recording medium or a cover which, together with the substrate, forms a sandwich arrangement, must satisfy various conditions, depending on whether the write/read operation is carried out through the substrate or through the protection. In the first case, the substrate must be transparent to the laser beam used, while in the second case the protective layer or the protective cover must be transparent to this beam. Moreover, the irreversible optical media must be substantially free of defects, and the recording layer must be capable of being produced by a simple economical method. Various irreversible optical information storage media are known, these media differing from one another in respect of the structural form of the light-absorbing layer, the inclusion of various lower layers, intermediate layers and top layers, and the type of write operation.

Homogeneous, or coherent, recording layers generally consist of semimetals, such as Te or Se, or of metals, eg. Au or Ag, which are deposited in the form of a coherent film. In writing with the laser, these layers are heated locally until the material melts or vaporizes, so that a hole forms in the film and results in a local change in reflectivity. The semimetals, such as Te and Se, have the advantages of a low melting point and poor thermal conductivity, which together make such layers very sensitive, but also possess the disadvantage that they are in general not very resistant to corrosion and are also toxic. The stable metals, eg. Au or Ag, have the disadvantages of a high melting point and very good thermal conductivity. Hence, these metal layers must be kept very thin in order to reduce the thermal conductivity. However, very expensive instrumentation is required for depositing these very thin metal layers. Furthermore, it is very difficult to produce these thin films in a form which is free from defects, ie. without pores and holes. Another disadvantage of the coherent recording layers is that the necessary protection can only be provided by the expensive sandwich arrangement, since the hole-forming process is hindered by a directly applied protective layer. It is therefore advantageous if, instead of coherent light-absorbing layers, particulate layers of this type are used for optical storage.

The particulate two-dimensional recording layers consist of metal or semimetal particles of any shape which have diameters of less than 1 $\mu$m and cover the substrate surface in the form of islands, ie. the particles are not in contact with one another. In contrast to the coherent layers, the thermal conductivity in the plane of the layer is greatly reduced. Hence, during optical recording, each particle is heated separately by the laser light, which results in an improvement in the sensitivity of these layers. A characteristic feature of this group of lightabsorbing layers is the fact that there is a definite relationship between layer thickness and particle diameter, the layer thickness being equal to the mean diameter of the layer-forming particles. U.S. Pat. No. 4,252,890 describes a photosensitive layer which consists of a monolayer of particles. To produce this, material having a low melting point, preferably selenium, is applied so that the layer has a particulate character. By exposure to an intense light source, preferably a xenon discharge lamp, the optical properties of the medium are modified as a result of sintering and/or vaporization of the particles. The high sensitivity which leads to sintering or vaporization of the relatively large particles having diameters of about 0.2 $\mu$m is achieved only when elements having a low melting point, eg. selenium, tellurium or zinc, are used. The poor corrosion resistance of these metals is a great disadvantage of these recording layers. EP-A No. 00 83 396 and WO-A No. 83/04330, too, describe island layers as light-absorbing recording layers for data storage. In contrast to the layers according to U.S. Pat. No. 4,252,890, these layers consist of very small particles having diameters of about 10 nm. Since the particle diameter corresponds to the layer thickness, the layers in this case are very thin. The extremely fine particles ensure the required high sensitivity during writing even in the case of the corrosion-resistant elements, such as gold. In this case too, the write operation involves sintering of the particles. However, apart from the advantages of high sensitivity during writing and very good long-term stability, these media possessing a two-dimensional particle arrangement also have particular disadvantages. The use of the extremely small particles leads to extremely thin layers which set high requirements in respect of the vaporization process under greatly reduced pressure. Furthermore, the island-forming process is dependent on the layer underneath. It is therefore necessary to use special lower layers, generally thin plastic films. In addition, certain substrate temperatures have to be set in order to ensure that islands are formed. Usually, the island layer is used in conjunction with a reflector layer. The reflectivity of the layer system is set so that the residual reflectivity is sufficient for the focusing motor of the laser beam, and the contrast between the written character and the surrounding area is very high. The required increase in the absorption of the island layer necessitates a larger number of islands per unit area. However, the islandforming process is complete when a certain number of islands per unit area have been formed, and the islands only grow in size. Thus, increasing the absorption of the layer has an adverse effect, resulting in a reduction in the sensitivity. In order to avoid this problem, triplelayer systems comprising a reflector, a transparent spacer layer and an island layer have been used. Although the desired reflectivity can be achieved by varying the thickness of the spacer layer, triple-layer systems have disadvantages, being complicated to produce and entailing high costs. The only suitable protection of the recording layer in this case is the sandwich arrangement, since a directly applied protective layer would cover the areas between the islands, which would interfere with the sintering process.

Particulate recording layers whose particles are embedded as a three-dimensional arrangement in a solid matrix, as described in U.S. Pat. No. 4,343,879, are also known, these recording layers consisting of finely divided silver particles in a solid organic matrix.

During the write operation, the silver particles absorb the laser radiation and the surrounding material is heated up and shrinks, with the result that the reflectivity of the layer is changed. Thus, the silver particles act here merely as absorbers and are not changed during the write process. The recording layers disclosed in U.S. Pat. No. 4,188,214 behave in a similar manner. Here, metal particles of Au, Pt, Rh, Ag, etc, are embedded in an inorganic matrix of metal sulfides, fluorides or oxides. As a result of irradiation with a laser, the matrix is deformed or vaporized and a character is formed, the reflectivity of which differs from that of the original layer.

However, the recording layers possessing these characteristics have the disadvantage that, in addition to producing the metal particles, it is also necessary to produce the matrix and furthermore to incorporate the particles in the particular matrix. Moreover, in addition to the properties of the particles, those of the matrix must also be taken into account in every case. Since the write process in these media is based on a deformation of the matrix, undesirable flaking of the matrix may occur, especially in the case of the inorganic matrix.

It is an object of the present invention to provide an irreversible optical recording medium which permits optical recording with high sensitivity coupled with high contrast between the written character and the original layer, ensures a long life through the use of corrosion-resistant metals and furthermore can be produced in a simple and economical manner.

We have found that this object is achieved and that, surprisingly, an irreversible optical medium for the storage of information by local modification of the optical properties of a recording layer under the action of a light beam with an irradiance of from 0.05 to 10 nJ $\mu m^2$, essentially consisting of a substrate and, applied on this, a non-coherent recording layer from 0.01 to 10 $\mu m$ thick, meets the requirements set, if the recording layer consists of a three-dimensional arrangement of particles having a mean particle diameter of from 4 to 40 nm and the recording layer has a porosity of from 2 to 100, defined as the quotient of the layer volume and the sum of the volumes of all particles in the layer.

The optical storage medium according to the invention is distinguished by its recording layer, which consists of a three-dimensional arrangement of particles. These are extremely finely divided and are held together predominantly by adhesion. Since the arrangement is a three-dimensional one, layer thickness and particle diameter are independent of one another. In contrast to the conventional optical storage media possessing island layers, this has the advantage that the reflectivity of the layer system, comprising reflector and particulate recording layer, can be varied as desired, simply by altering the thickness of the particulate layer while retaining the optimum diameter of the layer-forming particles. A high sensitivity of the storage layer may advantageously be achieved using stable high-melting metals, eg. gold.

Because high porosity of the recording layers is required according to the invention, the thermal conductivity required is very low. It can be kept at the same order of magnitude as for the island layers or for the layers which have particles arranged in a solid matrix, without it being necessary to accept the disadvantages known to be present in the case of these recording layers. The porosity is determined by measuring the thickness of the particulate layer under the optical microscope, with an accuracy of 0.5 $\mu m$. In the case of extremely thin layers, an edge fragment may be examined under the scanning electron microscope. If the area of the layer is known, the layer volume can thus be obtained. The volume of all particles in this layer follows from the determination of the weight of the material applied. The porosity is the quotient of the two parameters. The porosity of the recording layers according to the invention is from 2 to 100, advantageously from 10 to 80.

The particles of the recording layer advantageously consist of a corrosion-resistant metal or of an appropriate alloy. It has proven advantageous to select the components of this from the group consisting of Au, Pd, Pt, Rh, Ag, Cr and Cu. They have a mean particle diameter of from 4 to 40 nm, in particular from 5 to 20 nm. In addition to the stated elements, it is also possible to use aluminum, since these particles are protected by a thin oxide layer.

Suitable substrates for the novel optical recording media are all solid materials, those consisting of metal, ceramic, glass or plastic usually being employed for this purpose. This great latitude in choice is particularly advantageous since, in contrast to recording layers containing island layers, it is possible, for specific intended uses of the recording layers, to dispense with intermediate layers between the substrate and the recording layer.

The simplest arrangement of the novel storage layers consists of a substrate and a recording layer. During the write operation, the particles of the particulate layer are heated by absorption of the laser beam and sinter to larger units, the layer shrinking at this point. This reduces the number of particles in the region under consideration, and a hole in the particulate layer remains as a character. The layer is then more transparent at this point than in the surrounding area. Since some of the sintered material generally remains in the hole and has a higher reflectivity than the original particles, the character also has a substantially higher reflectivity than the original layer. This arrangement can be written on by means of a laser. Furthermore, the inscribed arrangement may also be exposed uniformly to a flash lamp, so that it is also possible, for example, to produce photographs.

To protect the particulate recording layer from mechanical or chemical damage, this layer may be provided with either a protective layer which is in direct contact with the recording layer, or a cover sheet which is a certain distance away from the recording layer. The cover sheet and the substrate then form a sandwich arrangement. The light incident during the write/read operation can pass either through the substrate or through the protective layer/protective cover. The first case requires a substrate transparent to the laser beam used, while the second case necessitates a transparent protective layer or protective cover. For an optical data medium, it is furthermore advantageous if a highly reflective coherent metal layer is placed underneath the particulate layer, on the side opposite that on which the light is incident. In addition to improving contrast, the reflector layer may be important for establishing a residual reflectivity of the medium, which typically is 10% and is required for the focussing motor of the write/read apparatus.

Furthermore, because of the high porosity of the recording layer, the particles can undergo sintering during the write operation without the shape of the protective layer being altered, ie. without the sensitivity of the novel recording layer deteriorating, as is the case for coherent layers and island layers, where it is a disadvantage.

The novel optical storage layers are produced by vaporizing metals in an inert gas atmosphere under from 0.1 to 200 mbar. It is known that ultrafine powders can be formed in this way by cooling the vaporized metal through impacts with the inert gas atoms, as described, for example, by C. Granquist and R. Bahrman, J. Appl. Phys. Col. 47 (1976), 2200 et seq. It is also known that the particle sizes of the powders are dependent on the inert gas pressure, on the evaporator temperature and on the geometry, ie. the position of the target surface with respect to the evaporator source. Hence, the particle diameter increases with increasing inert gas pressure and/or with increasing evaporator temperature. We have found, surprisingly, that deposition of the particles thus formed in the gas phase gives the novel optical storage layer if the particles are deposited on an initially taken cooled substrate in the vicinity of the evaporator. The three-dimensional layers produced in this manner possess high porosity, with the result that the layers are very useful for the production of irreversible optical recording media. The production of particulate Au and Ag layers by deposition under Ar pressures of from 1 to 20 mbar gives porosities of from 10 to 80, the porosity increasing with increasing inert gas pressure. The evaporator pressure is advantageously chosen so that the vapor pressure of the material vaporized is about 0.1 mbar. Higher temperatures lead to non-uniform particle size spectra, since the vapor density in the region of the evaporator is too high. Lower temperatures result in very low evaporation rates, necessitating long exposure times.

In contrast to the prior art irreversible optical storage media, the novel ones possess high sensitivity coupled with high contrast and have a long life. A particular advantage is the simple method of production and the simple manner in which the required optical properties can be obtained.

The Examples which follow illustrate the invention.

EXAMPLE 1

A particulate Ag layer on a glass substrate was produced. The evaporator temperature was 1200° C., the Ar pressure was 5 mbar, the distance between the evaporator and the substrate was 2 cm and the vaporization time was 60 sec. The particulate recording layer obtained consisted of Ag particles having a diameter of 10 nm. The layer thickness determined by means of an optical microscope was 5 $\mu$m, and the thickness calculated from the weight of Ag deposited was 0.17 $\mu$m, giving a porosity of 30. Under the optical microscope, the layer surface appeared to be covered with domes, and the reflectivity in the wavelength range from 0.3 to 1.0 $\mu$m was only about 1%. The layer was written on by means of an HeNe laser, using an energy of 4 nJ per character. The pulse duration was 200 nsec, the power 20 mW and the wavelength 0.64 $\mu$m. The laser was focussed manually to about 1 $\mu$m. The characters inscribed were circular holes having crisp edges and a diameter of 1.5 $\mu$m. The ultrafine particles sintered under the action of the laser beam, and the sintered material lay on the surface of the glass substrate, ie. at the bottom of the cylindrical hole. In reflected light, the characters appeared as clearly visible pale points. Increasing the writing energy to 27 nJ by lengthening the pulse to 1.25 $\mu$sec increased the hole diameter very slightly to 2 $\mu$m, demonstrating the extremely low thermal conductivity of the novel recording layer.

EXAMPLE 2

A particulate Au layer on a glass substrate was produced. The evaporator temperature was 1600° C., the Ar pressure was 12 mbar and the vaporization time was 40 sec. The particulate recording layer consisted of Au particles having a diameter of 15 nm. The layer thickness was 3 $\mu$m, and the thickness calculated from the weight of Au deposited was 0.06 $\mu$m, giving a porosity of 50. The reflectivity in the wavelength range from 0.3 to 1 $\mu$m was less than 2 %. The layer was written on by means of an HeNe laser using an energy of 4 nJ/character. Circular holes which had a diameter of 1.5 $\mu$m and extended down to the glass substrate were formed. Examination under the scanning electron microscope showed that an intertwined mass of coarser sinter products had formed in the cylindrical hole. At the higher write energy of 27 nJ/character, the holes became slightly larger and the sintered material no longer formed an intertwined mass but lay at the bottom of the hole, as in Example 1. In reflected light, both types of character appeared as pale, circular points having crisp edges and contrasting greatly with the surrounding particulate layer.

EXAMPLE 3

A particulate Au layer backed with a reflector layer was produced on a glass substrate. A 0.06 $\mu$m thick coherent Au layer was applied onto a glass substrate by vapor deposition under greatly reduced pressure. This reflector layer was provided with a 5 $\mu$m thick particulate Au layer under the same preparation conditions as in Example 2. This recording layer possessed the same sensitivity as that described in Example 2. The laser pulse, having an energy of 4 nJ/character produced circular holes of 1 μm diameter in the particulate layer. At a write energy of 27 nJ/character, the hole diameter was 1.5 μm. The reflector layer was bared, and the contrast between the character and the surrounding recording layer in reflected light was even better than in the case of the recording layer produced as described in Example 2.

EXAMPLE 4

A coherent Ag layer about 0.06 μm thick was applied onto a glass substrate by vapor deposition under greatly reduced pressure. In contrast to Example 3, this reflector layer was provided with a thin particulate Au layer as a recording layer. The vaporization temperature was 1600° C., the Ar pressure was 10 mbar and the vaporization time was about 3 sec. Measurement under the optical microscope showed that the layer thickness was below the detection limit of 0.5 μm. Photographs with the transmission electron microscope showed that the layer consisted on average of more than 5 strata of atoms, indicating a lower limit of about 0.07 μm for the layer thickness, since the particle diameter was 15 nm. This thin layer reduced the reflectivity of the Ag layer to only about 15 % at a wavelength of 1 μm. The layer system had a reddish shimmer. The residual reflectivity of 15 % was selected so that the automatic focussing apparatus of the write/read laser in the infrared laser measuring equipment just responded and, on the other hand, the contrast between the character and the surrounding recording layer was very high. This layer system was furthermore provided with a 1 mm thick Plexiglas cover to protect the particulate layer from mechanical damage. The write operation was carried out through this protective cover. The measured sensitivity was better than 0.6 nJ/character, the saturation being 2 nJ/character. The wavelength of the laser was 0.86 μm and the power was 12 mW.

EXAMPLE 5

Layers as described in Examples 1 and 2 were covered with a photographic positive and exposed to a flash energy of about 15 nJ/μm$^2$ from a point in the immediate vicinity. Clear, crisp contact copies of the photographic positive were obtained in this manner. The more highly exposed parts of the particulate layers shrunk to a greater extent than the less exposed ones. This made them more transparent in transmitted light and more reflective in incident light. These layers gave good gradations on the gray scale.

We claim:

1. An irreversible optical medium for storing information by local modification of the optical properties of a recording layer under the action of a light beam with a irradiance of from 0.05 to 10 nj/μm$^2$, essentially consisting of a substrate and, applied on this, a particular recording layer from 0.01 to 10μm thick, wherein the recording layer consists of a three-dimensional arrangement of particles of a corrosion resistant metal selected from the group consisting of Au, Pd, Pt, Rh, Ag, Cr, Cu, and Al and the alloys containing said metals having a mean particle diameter of from 4 to 40 nm, and has a porosity, i.e. the quotient of the layer volume and the sum of the volumes of all particles in the layer, of from 2 to 100.

2. An irreversible optical medium as defined in claim 1, wherein the particles of the recording layer are Au or Ag particles.

3. An irreversible optical medium for information storage as defined in claim 1, wherein the medium consists of the substrate, the particulate recording layer applied on this, and a protection which is transparent to the light radiation used, and the protection is a film applied directly on the recording layer or is a cover sheet, and the medium is provided, between the substrate and the particulate recording layer, with a highly reflective coherent metal layer in order to improve the contrast.

4. An irreversible optical medium for information storage as defined in claim 1, wherein the medium consists of a substrate transparent to the light radiation used, the particulate recording layer applied on this, and a protective layer, and is provided, between the protective layer and the particulate layer, with a highly reflective coherent metal layer in order to improve the contrast.

* * * * *